United States Patent
Wang et al.

(10) Patent No.: US 11,631,238 B1
(45) Date of Patent: Apr. 18, 2023

(54) METHOD FOR RECOGNIZING DISTRIBUTION NETWORK EQUIPMENT BASED ON RASPBERRY PI MULTI-SCALE FEATURE FUSION

(71) Applicants: Jiangxi Electric Power Research Institute of State Grid, Nanchang (CN); Jiangxi Normal University, Nanchang (CN)

(72) Inventors: Wenbin Wang, Nanchang (CN); Ruixiang Fan, Nanchang (CN); Chen Chen, Nanchang (CN); Zhixiang Deng, Nanchang (CN); Yuanwen Lu, Nanchang (CN); Jianbing Pan, Nanchang (CN)

(73) Assignees: IANGXI ELECTRIC POWER RESEARCH INSTITUTE OF STATE GRID, Nanchang (CN); JIANGXI NORMAL UNIVERSITY, Nanchang (CN)

( * ) Notice: Subject to any disclaimer, the term of this patent is extended or adjusted under 35 U.S.C. 154(b) by 0 days.

(21) Appl. No.: 17/952,690

(22) Filed: Sep. 26, 2022

(30) Foreign Application Priority Data

Apr. 13, 2022 (CN) .......................... 202210381347.X

(51) Int. Cl.
*G06V 10/80* (2022.01)
*G06V 10/82* (2022.01)
(Continued)

(52) U.S. Cl.
CPC .......... *G06V 10/806* (2022.01); *G06V 10/763* (2022.01); *G06V 10/764* (2022.01); *G06V 10/766* (2022.01); *G06V 10/774* (2022.01); *G06V 10/7715* (2022.01); *G06V 10/82* (2022.01); *G06V 20/17* (2022.01); *G06V 20/176* (2022.01)

(58) Field of Classification Search
CPC ....... G06V 10/82; G06V 10/806; G06V 10/77
See application file for complete search history.

(56) References Cited

FOREIGN PATENT DOCUMENTS

| CN | 108764072 A | 11/2018 |
|---|---|---|
| CN | 110084292 A | 8/2019 |

(Continued)

*Primary Examiner* — Ross Varndell
(74) *Attorney, Agent, or Firm* — Mayer & Williams PC; Stuart H. Mayer

(57) ABSTRACT

Disclosed is a method for recognizing distribution network equipment based on Raspberry Pi multi-scale feature fusion. The method includes obtaining an initial sample data set; constructing an object detection network composed of EfficientNe-B0 backbone network, multi-scale feature fusion module and a regression classification prediction head; training the object detection network by taking the initial sample data set as a training sample; finally, detecting inspection pictures by using a the trained object detection network. A light-weight EfficientNet-B0 backbone network feature extraction method obtains more features of objects. Meanwhile, an introduction of multi-scale feature fusion better adapts to small object detection, and a light-weight y_pred regression classification detection head is effectively deployed and realized in Raspberry Pi embedded equipment with tight resources and limited computing power.

7 Claims, 2 Drawing Sheets

(51) Int. Cl.
*G06V 10/766* (2022.01)
*G06V 10/764* (2022.01)
*G06V 20/10* (2022.01)
*G06V 10/762* (2022.01)
*G06V 10/77* (2022.01)
*G06V 20/17* (2022.01)
*G06V 10/774* (2022.01)

(56) References Cited

FOREIGN PATENT DOCUMENTS

| CN | 110287849 | A |   | 9/2019  |            |
|----|-----------|---|---|---------|------------|
| CN | 111275759 | A | * | 6/2020  | G06N 3/0454 |
| CN | 111723705 | A | * | 9/2020  |            |
| CN | 111914937 | A |   | 11/2020 |            |
| CN | 112150821 | A |   | 12/2020 |            |
| CN | 112183203 | A |   | 1/2021  |            |
| CN | 112464765 | A |   | 3/2021  |            |
| CN | 112861915 | A |   | 5/2021  |            |
| CN | 113158829 | A |   | 7/2021  |            |
| CN | 113538387 | A |   | 10/2021 |            |
| CN | 113569672 | A |   | 10/2021 |            |
| CN | 113705478 | A |   | 11/2021 |            |
| CN | 113705763 | A | * | 11/2021 |            |
| CN | 113780211 | A |   | 12/2021 |            |
| CN | 114240878 | A |   | 3/2022  |            |

\* cited by examiner

METHOD FOR RECOGNIZING DISTRIBUTION NETWORK EQUIPMENT BASED ON RASPBERRY PI MULTI-SCALE FEATURE FUSION

CROSS-REFERENCE TO RELATED APPLICATIONS

This application claims priority to Chinese Patent Application No. 202210381347.X, filed on Apr. 13, 2022, the contents of which are hereby incorporated by reference.

TECHNICAL FIELD

The application relates to the technical field of image recognition of power inspection direction, and in particular to a method for recognizing distribution network equipment based on Raspberry Pi multi-scale feature fusion.

BACKGROUND

At present, the development of deep learning object detection algorithm based on convolutional neural network is roughly divided into two directions: two-stage object detection method based on candidate regions and one-stage object detection method based on regression. The two-stage object detection method generally has the characteristics of slow speed and high precision, while the one-stage object detection method generally has the characteristics of fast speed and low precision. Although the Regin-Convolutional Neural Network (R-CNN) series of two-stage object detection method based on candidate regions have achieved satisfying detection results, the two-stage object detection method is far from ideal in real-time effect in terms of recognition speed due to requirement on high accuracy and speed of equipment recognition in distribution network, and the network is large and numerous. Different from the two-stage object detection method, a first-stage object detection method based on EfficientNet-B0 and using y_pred detection classification heads has relatively few network model parameters, superior real-time performance, and high recognition speed and accuracy.

The comprehensive width, depth and resolution of extracted backbone network is comprehensively scaled and expanded according to the network, which is suitable for embedded Unmanned Aerial Vehicle (UAV) equipment represented by Raspberry Pi. However, as there are big objects of transformers in a same picture, there are also small objects of knife switches and drop-out fuses of power distribution network equipment, and the Con2D+GlobalAveragePooling2D+Dense classification head of EfficientNet-B0 backbone extraction network has poor effect in detecting knife switches and drop-out fuses of small objects. Moreover, while a deep learning recognition algorithm brings high precision, its huge computational cost also makes it difficult for ordinary embedded devices to bear, which limits a combination of deep learning recognition algorithm and embedded UAV equipment.

SUMMARY

In order to overcome the above shortcomings, the objective of the present application is to provide a method for recognizing distribution network equipment based on Raspberry Pi multi-scale feature fusion. The method for recognizing distribution network equipment based on Raspberry Pi multi-scale feature fusion includes a lightweight EfficientNet-B0 network, a multi-scale feature fusion module and a regression classification prediction head, and the regression classification prediction head adopts y_pred detection classification heads with fewer parameters.

The technical scheme of the application to solve the technical problem is as follows. A method for recognizing distribution network equipment based on Raspberry Pi multi-scale feature fusion includes following steps.

S1, obtaining an initial sample data set.

S2, constructing an object detection network including an EfficientNe-B0 backbone network, a multi-scale feature fusion module and a regression classification prediction head.

The EfficientNe-B0 backbone network includes one Conv+BN+Leaky Relu (CBL) module and seven Block modules, and the seven Block modules are Block1 module, Block2 module, Block3 module, Block4 module, Block5 module, Block6 module and Block7 module in turn.

The regression classification prediction head adopts y_pred detection classification heads and the y_pred detection classification heads are y_pred1 detection classification head, y_pred2 detection classification head and y_pred3 detection classification head respectively.

The multi-scale feature fusion module includes four fusion paths. A first fusion path includes CBL1 module and Conv1 layer. The CBL1 module obtains a feature map output by the Block7, and a feature map processed by the CBL1 module enters the Conv1 layer for convolution, and then enters the y_pred1 detection classification head.

A second fusion path includes concat1 layer, CBL2 module and Conv2 layer. The concat1 layer acquires a feature map output by the Block5 module and acquires the feature map processed by the CBL1 module through up sampling for fusion, a fused feature map is processed by the CBL2 module, and the fused feature map processed by the CBL2 module enters the Conv2 layer for convolution and then enters the y_pred2 detection classification head.

A third fusion path includes concat2 layer, CBL3 module and Conv3 layer. The concat2 layer acquires a feature map output by the Block3 module and acquires the feature map processed by the CBL2 module through up sampling for fusion, a fused feature map is processed by the CBL3 module, and the fused feature map processed by the CBL3 module enters the Conv3 layer for convolution and then enters the y_pred3 detection classification head.

A fourth fusion path includes concat3 layer and CBL4 module. The concat3 layer acquires a feature map output by the Block2 module and acquires the feature map processed by the CBL3 module through up sampling for fusion. A fused feature map is processed by the CBL4 module, and the CBL4 module is connected to the CBL3 module through down sampling.

S3, training the object detection network by taking the initial sample data set as a training sample: extracting features by the EfficientNe-B0 backbone network, and performing multi-scale feature fusion by the multi-scale feature fusion module to output three fused feature maps, and getting these three fused feature maps to enter the y_pred detection classification heads for recognition.

S4, detecting inspection pictures by using a trained object detection network: extracting features by the EfficientNe-B0 backbone network, and performing multi-scale feature fusion by the multi-scale feature fusion module to output three fused feature maps, and getting these three fused feature maps to enter the y_pred detection classification heads for recognition to obtain recognition results.

Optionally, the Block1 module comprises one MBConv1Block module, a convolution kernel size is 3×3, and a stride is 2×2. The Block2 module comprises two MBConv6Block modules, and a convolution kernel size is 3×3 and a stride is 2×2. The Block3 module comprises two MBConv6Block modules, and a convolution kernel size is 5×5 and a stride is 2×2. The Block4 module comprises three MBConv6Block modules, and a convolution kernel size is 3×3 and a stride is 2×2. The Block5 module comprises three MBConv6Block modules, and a convolution kernel size is 5×5 and a stride is 2×2. The Block6 module comprises four MBConv6Block modules, and a convolution kernel size is 5×5 and a stride is 2×2. The Block7 module comprises one MBConv6Block module, a convolution kernel size is 3×3, and a stride is 1×1. The MBConv6Block modules perform depthwise separable convolution.

Optionally, in a process of extracting features, an inverted large residual structure with deep separable convolution and channel attention mechanism is introduced. A dimension is increased by 1×1 convolution before the 3×3 or 5×5 network structure, and a Squeeze- and Excitation Networks (SENet) channel attention mechanism is added after the 3×3 or 5×5 network structure. Finally, the dimension is reduced by 1×1 convolution.

Optionally, the depthwise separable convolution is performed in the MBConv6Block modules in the EfficientNe-B0 backbone network, and the depthwise separable convolution includes two parts: a depthwise convolution of a spatial dimension and a pointwise convolution of a channel dimension.

Optionally, extracting features by the EfficientNe-B0 backbone network means that seven feature maps are generated by continuous convolution of the Efficient Net-B0 backbone network.

Optionally, the multi-scale feature fusion selects four feature maps output by the Block2 module, the Block3 module, the Block5 module and the Block7 module for multi-scale feature fusion stacking, so as to keep shallow features as much as possible.

Optionally, channel depths of the y_pred3 detection classification head, the y_pred2 detection classification head and the y_pred1 detection classification head are all 255, and a regular ratio of side lengths is 13:26:52. The y_pred3 detection classification head and the y_pred2 detection classification head are used to identify small object knife switches and fuses, and the y_pred1 detection classification head is used to identify transformers.

Optionally, a process of the y_pred detection classification heads for recognition is as follows: each fused feature map enters the y_pred detection classification heads to generate prediction boxes, the prediction boxes generated by the three y_pred detection classification heads are the same, each y_pred detection classification head is provided with three anchor boxes with different sizes, and sizes of the three anchor boxes of y_pred3 detection classification head correspond to three sizes of the knife switches. Sizes of three anchor boxes of y_pred2 detection classification head correspond to three sizes of the fuses, and sizes of three anchor boxes of y_pred1 detection classification head correspond to three sizes of transformers. Sizes of the prediction boxes and nine anchor boxes are compared, a class of an anchor box with the smallest size deviation is selected as an output, which of the knife switches, the fuses and the transformers feature maps belong to is judged, and ground truth boxes are output as recognition results. The anchor boxes are obtained by k-means clustering the initial sample data set, and inspection pictures of distribution network equipment are divided into three categories: knife switches, fuses and transformers, and each category of inspection pictures is clustered to obtain three anchor boxes with different sizes. Every time output ground truth boxes are supplemented to the initial sample data set for a next k-means clustering.

The application has the advantages that: in view of problems of heavy workload and low efficiency of conventional manual power line survey, inspection and acceptance, a man-machine linkage inspection by using embedded Raspberry Pi Unmanned Aerial Vehicle (UAV) achieves large-scale and rapid information search for longer lines, and takes pictures of power lines and additional equipment. The method of the application is used for equipment inspection on common lines and intelligent survey design and acceptance method research of power distribution network engineering construction. The application has the following characteristics.

Firstly, the object detection network in the application has small parameter quantity and high precision, and is suitable for embedding circuit inspection terminal equipment of miniature unmanned aerial vehicle represented by Raspberry Pi.

Secondly, the backbone extraction network adopts lightweight EfficientNet-B0 backbone network, which is more suitable for being arranged on micro edge equipment such as Raspberry Pi UAV system. Y_pred detection classification heads are used to replace Con2D+ GlobalAveragePooling2D+Dense classification head of EfficientNet-B0 network.

Thirdly, in the process of extracting features, the inverse residual structure of depthwise separable convolution and channel attention mechanism is introduced, which expands the receptive field while retaining more shallow features.

Lastly, the multi-scale feature fusion module is introduced to avoid feature loss with the increase of network depth.

DETAILED DESCRIPTION OF THE EMBODIMENTS

Aiming at distribution network equipment images taken by Unmanned Aerial Vehicles (UAVs), mainly aiming at problems that mobile terminals and embedded UAVs are difficult to run complex deep learning network models due to the limitation of hardware resources and computing power, small object distribution network equipment disappears with the deepening of network features, and the classification detection heads have poor recognition effect, the application provides a method for recognizing distribution network equipment based on Raspberry Pi multi-scale feature fusion, where the identified distribution network equipment mainly includes transformers, knife switches and fuses.

Figure 1:
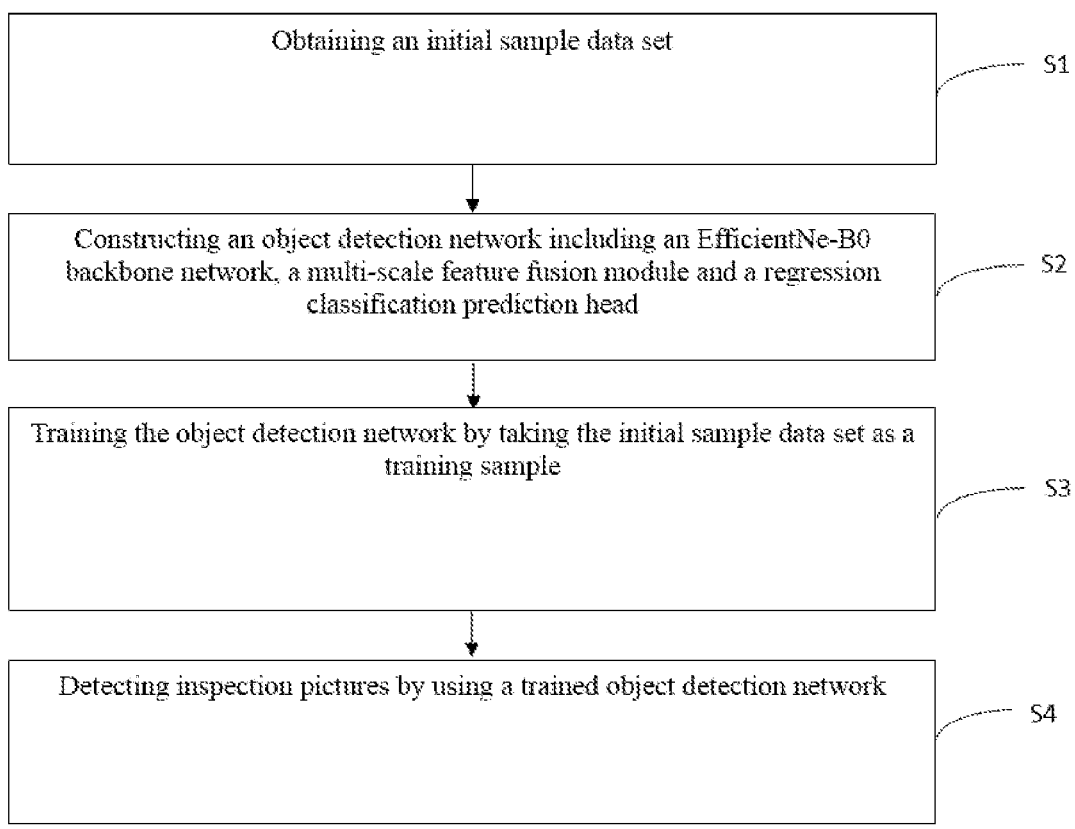
FIG. 1 is a flowchart of the present application.
Figure 2:
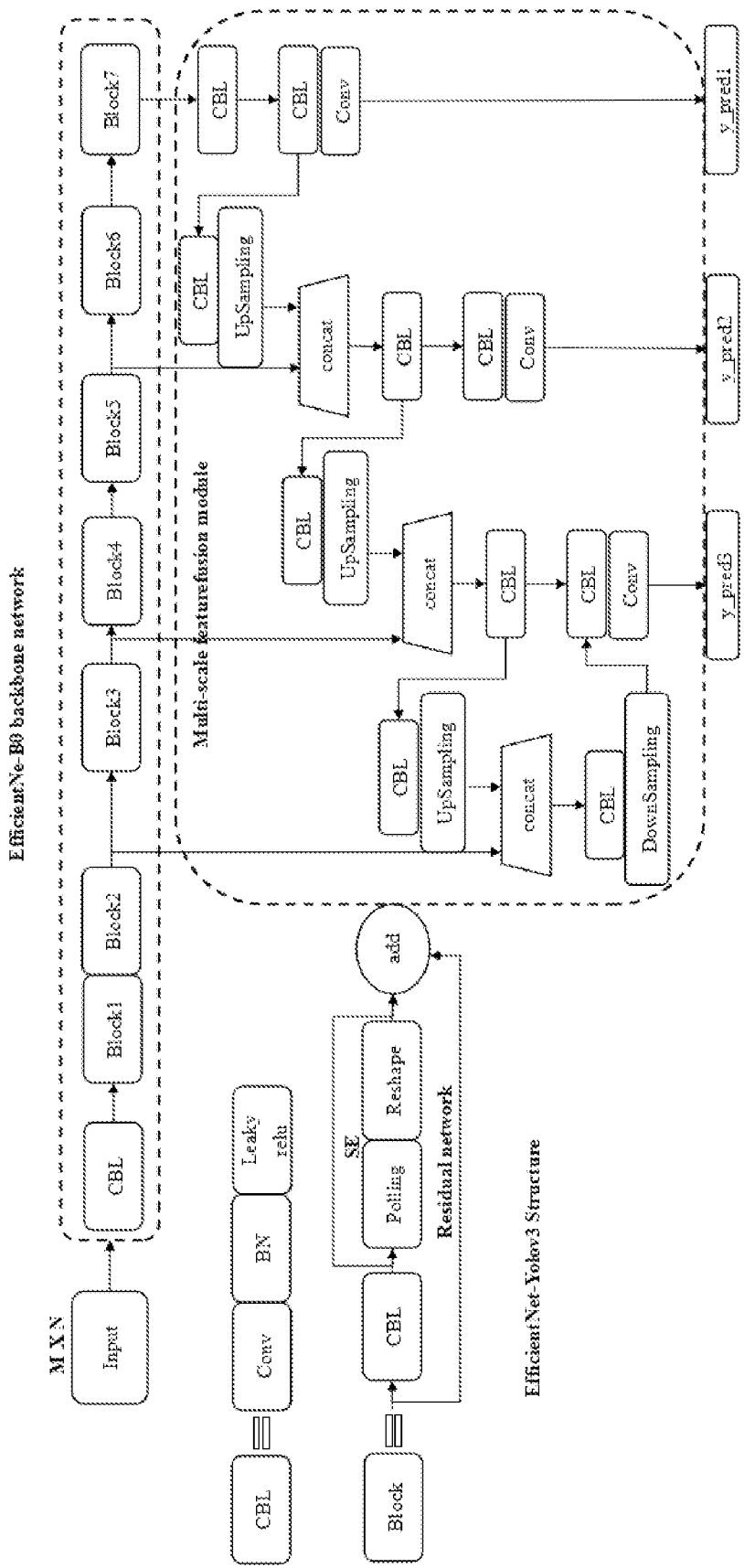
FIG. 2 is a schematic diagram of an object detection network of the present application.

Referring to FIG. 1 and FIG. 2, a method for recognizing distribution network equipment based on Raspberry Pi multi-scale feature fusion of the present application includes the following steps.

S1, obtaining an initial sample data set: manually labelling and classifying collected images of transformers, knife switches and fuses, with 100 images of transformers, knife switches and fuses respectively, and then transforming and amplifying them as the initial sample data set.

S2, constructing an object detection network including an EfficientNe-B0 backbone network, a multi-scale feature fusion module and a regression classification prediction head.

The EfficientNe-B0 backbone network includes one Conv+BN+Leaky Relu (CBL) module and seven Block modules, and the seven Block modules are Block1 module, Block2 module, Block3 module, Block4 module, Block5 module, Block6 module and Block7 module in turn.

The regression classification prediction head adopts y_pred detection classification heads and the y_pred detection classification heads are y_pred1 detection classification head, y_pred2 detection classification head and y_pred3 detection classification head respectively.

The multi-scale feature fusion module includes four fusion paths. A first fusion path includes CBL1 module and Conv1 layer. The CBL1 module obtains a feature map output by the Block7, and a feature map processed by the CBL1 module enters the Conv1 layer for convolution, and then enters the y_pred1 detection classification head.

A second fusion path includes concat1 layer, CBL2 module and Conv2 layer. The concat1 layer acquires a feature map output by the Block5 module and acquires the feature map processed by the CBL1 module through up sampling for fusion, a fused feature map is processed by the CBL2 module, and the fused feature map processed by the CBL2 module enters the Conv2 layer for convolution and then enters the y_pred2 detection classification head.

A third fusion path includes concat2 layer, CBL3 module and Conv3 layer. The concat2 layer acquires a feature map output by the Block3 module and acquires the feature map processed by the CBL2 module through up sampling for fusion, a fused feature map is processed by the CBL3 module, and the fused feature map processed by the CBL3 module enters the Conv3 layer for convolution and then enters the y_pred3 detection classification head.

A fourth fusion path includes concat3 layer and CBL4 module. The concat3 layer acquires a feature map output by the Block2 module and acquires the feature map processed by the CBL3 module through up sampling for fusion. A fused feature map is processed by the CBL4 module, and the CBL4 module is connected to the CBL3 module through down sampling.

S3, training the object detection network by taking the initial sample data set as a training sample: extracting features by the EfficientNe-B0 backbone network, and performing multi-scale feature fusion by the multi-scale feature fusion module to output three fused feature maps, and getting these three fused feature maps to enter the y_pred detection classification heads for recognition.

S4, detecting inspection pictures by using a trained object detection network: extracting features by the EfficientNe-B0 backbone network, and performing multi-scale feature fusion by the multi-scale feature fusion module to output three fused feature maps, and getting these three fused feature maps to enter the y_pred detection classification heads for recognition to obtain recognition results.

In this present application, the CBL module (CBL=Conv+BN+Leaky relu) is constructed by ordinary convolution (Cony), Batch normalization (BN) and Leaky Relu activation functions, and the multi-scale feature fusion module includes CBL1, CBL2, CBL3 and CBL4. Structures of the CBL module, the CBL1 module, the CBL2 module, the CBL3 module and the CBL4 module are Conv+BN+Leaky relu.

In this present application, the Block1 module comprises one MBConv1Block module, a convolution kernel size is 3×3, and a stride is 2×2. The Block2 module comprises two MBConv6Block modules, and a convolution kernel size is 3×3 and a stride is 2×2. The Block3 module comprises two MBConv6Block modules, and a convolution kernel size is 5×5 and a stride is 2×2. The Block4 module comprises three MBConv6Block modules, and a convolution kernel size is 3×3 and a stride is 2×2. The Block5 module comprises three MBConv6Block modules, and a convolution kernel size is 5×5 and a stride is 2×2. The Block6 module comprises four MBConv6Block modules, and a convolution kernel size is 5×5 and a stride is 2×2. The Block7 module comprises one MBConv6Block module, a convolution kernel size is 3×3, and a stride is 1×1. The MBConv6Block modules perform depthwise separable convolution. The MBConv6Block modules are actually depthwise separable convolution in MobileNetV3 network. Each MBConv is followed by a number 1 or 6, where 1 or 6 is the multiplying factor n. In other words, a first 1×1 convolution layer in MBConv expands the number of feature channels of an input feature matrix to n times. The design idea is Inverted residuals structure and residual structure. Before 3×3 or 5×5 network structure, 1×1 convolution is used to increase dimension, and after 3×3 or 5×5 network structure, a channel attention mechanism is added. Finally, 1×1 convolution is used to reduce dimension. In the process of extracting features, an inverted large residual structure of depthwise separable convolution and channel attention mechanism is introduced, which expands receptive field while retaining more shallow features.

The MBConv6Block modules first use Conv2D (1×1) convolution to increase dimension, and then uses DepthwiseConv2D (3×3 or 5×5) convolution layer by layer to extract features across feature points. After feature extraction, a Squeeze- and Excitation Networks (SENet) channel attention mechanism is added to a top. Finally, the Conv2D (1×1) convolution is used to reduce the dimension, and a bottom is a residual edge and is not processed.

Depthwise separable convolution is performed in MBConv6Block modules in EfficientNe-B0 backbone network, and the depthwise separable convolution includes two parts: depthwise convolution of spatial dimension and pointwise convolution of feature channel dimension. Compared with a standard convolution, the depthwise separable convolution has less execution times and is more efficient.

In the application, the inverse residual structure of the channel attention mechanism mainly acts on the Block modules, and the 1×1 convolution is used before the 3×3 or 5×5 network structure, and a residual edge about the SENet channel attention mechanism is added after the 3×3 or 5×5 network structure. The SENet channel attention mechanism includes compression pooling, excitation and feature recalibration.

Compression pooling: feature compression is carried out along the spatial dimension, and each two-dimensional feature channel is turned into a real number. This real number has a global receptive field to some extent, and an output dimension matches the number of input feature channels. This real number represents a global distribution of responses on feature channels, and makes a layer close to the input also get the global receptive field. A concrete operation is to pool a feature map W×H×C (W, H and C represent a height, a width and the number of feature channels of the feature map respectively) globally, and get a feature map with a size of 1×1×C, and the feature map with a size of 1×1×C has a global receptive field.

The excitation is that features with the size of 1×1×C is subjected to two fully connected neural networks, and finally a mechanism similar to a recurrent neural network is used to generate weights for each feature channel.

Feature recalibration: a C-dimensional feature channel weighted by multiplying the weight value of each feature channel with a two-dimensional matrix of the corresponding feature channel is used as the input data of a next stage, so that important features are enhanced and unimportant features are weakened and the directivity of extracted feature maps is stronger.

The channel attention mechanism learns weights of feature through loss, and obtains an importance of each feature map, and then uses this importance to assign a weight value to each feature channel, so that a neural network focuses on a feature map with large weight value, and the object detection network achieves better results.

The backbone network of the conventional EfficientNet-B0 includes one Stem+16 blocks+Con2D+GlobalAveragePooling2D+Dense and is divided into nine stages. Stage 1 is an ordinary convolution layer (including BN and activation functions) with a convolution kernel size of 3×3 and a stride of 2. Stage 2-stage 8 all are formed by repeatedly stacked MBConv structures, while stage 9 is composed of an ordinary 1×1 convolution layer, an average pool layer and a fully-connected layer, and core content of the stage 9 is 16 mobile inverted bottleneck convolution modules. Other structures have little difference with conventional convolution neural networks. According to the application, the y_pred detection classification heads are used to replace the Con2D+GlobalAveragePooling2D+Dense classification head of the EfficientNet-B0 network.

Accord to that application, an image with an adjusted size of m×n is input to the object detection network, and extracting features by the EfficientNe-B0 backbone network refer to feature loss phenomenon caused by the continuous convolution of seven feature images generate by the EfficientNet-B0 backbone network with the increase of network layers.

According to the multi-scale feature fusion method, four feature maps output by the Block2 module, the Block3 module, the Block5 module and the Block7 module are selected for multi-scale feature fusion stacking, so that shallow features are reserved as much as possible. The Block2 module and the Block3 module are suitable for detecting knife switches and fuses because of small convolution times, small down sampling multiple (shallow feature layer), small receptive field of feature map and sufficient information of small-scale feature resolution. The Block5 module and the Block7 module are suitable for detecting transformers because of more convolution times and larger down sampling multiple (deep feature layer), and enough large-scale feature resolution information to deal with large objects. Through multi-scale feature fusion, the speed and accuracy are weighed, and more robust semantic information is obtained through multi-scale feature fusion. Semantic features of small objects are kept, and the detection effect of small object knife switches and fuses is improved.

The regression classification prediction head adopts y_pred detection classification heads. The main reason is that Con2D+GlobalveragePooling2D+Dense classification head has poor effect in detecting small object knifes switches and fuse. y_pred detection classification heads have high detection accuracy and lighter network. The y_pred detection classification heads include a 3×3 convolution plus last 1×1 convolution. The 3×3 convolution is for feature integration, and the 1×1 convolution is to adjust the number of feature channels. The y_pred detection classification heads draw experience from a design idea of feature pyramid networks (FPN) and uses multi-scale to detect objects of different size. The finer a grid cell, the finer objects are detected. The y_pred3 detection classification head, the y_pred2 detection classification head and the y_pred1 detection classification head have channel depths of 255, and a regular ratio of side lengths is 13:26:52. The y_pred3 detection classification head and the y_pred2 detection classification head are used to identify small object knife switches and fuses, and the y_pred1 detection classification head is used to identify transformers.

In this present application, a process of the y_pred detection classification heads for recognition is as follows: each fused feature map enters the y_pred detection classification heads to generate prediction boxes, the prediction boxes generated by the three y_pred detection classification heads are the same, each y_pred detection classification heads are provided with three anchor boxes with different sizes, and sizes of the three anchor boxes of the y_pred3 detection classification head correspond to three sizes of the knife switches. Sizes of three anchor boxes of y_pred2 detection classification head correspond to three sizes of the fuses, and sizes of three anchor boxes of the y_pred1 detection classification head correspond to three sizes of transformers. Sizes of the prediction boxes and nine anchor boxes are compared, a class of an anchor box with the smallest size deviation is selected as an output, which of the knife switches, the fuses and the transformers feature maps belong to is judged, and ground truth boxes are output as recognition results. The anchor boxes are obtained by k-means clustering the initial sample data set, and inspection pictures of distribution network equipment are divided into three categories: knife switches, fuses and transformers, and each category of inspection pictures is clustered to obtain three anchor boxes with different sizes. Every time output ground truth boxes are supplemented to the initial sample data set for a next k-means clustering.

The above is only a preferred embodiment of the present application, and it is not intended to limit the present application. Any modifications, equivalent substitutions and improvements made within the spirit and principle of the present application should be included in the scope of protection of the present application.

What is claimed is:

1. A method for recognizing distribution network equipment based on Raspberry Pi multi-scale feature fusion, comprising following steps:

step S1, obtaining an initial sample data set;

step S2, constructing an object detection network including an EfficientNet-B0 backbone network, a multi-scale feature fusion module and a regression classification prediction head;

wherein:

the EfficientNet-B0 backbone network comprises one Conv+BN+Leaky ReLU (CBL) module and seven Block modules, and the seven Block modules are Block1 module, Block2 module, Block3 module, Block4 module, Block5 module, Block6 module and Block7 module in turn;

the regression classification prediction head adopts three y_pred detection classification heads and the three y_pred detection classification heads are y_pred1 detection classification head, y_pred2 detection classification head and y_pred3 detection classification head respectively;

the multi-scale feature fusion module comprises four fusion paths; wherein a first fusion path includes a CBL1 module and a Conv1 layer, wherein the CBL1 module obtains a feature map output by the Block7, and a feature map processed by the CBL1 module enters the Conv1 layer for convolution, and then enters the y_pred1 detection classification head;

a second fusion path includes a concat1 layer, a CBL2 module and a Conv2 layer, the concat1 layer acquires a feature map output by the Block5 module and acquires the feature map processed by the CBL1 module through upsampling for fusion, a fused feature map is processed by the CBL2 module, and the fused feature map processed by the CBL2 module enters the Conv2 layer for convolution and then enters the y_pred2 detection classification head;

a third fusion path includes a concat2 layer, a CBL3 module and a Conv3 layer, the concat2 layer acquires a feature map output by the Block3 module and acquires the feature map processed by the CBL2 module through upsampling for fusion, a fused feature map is processed by the CBL3 module, and the fused feature map processed by the CBL3 module enters the Conv3 layer for convolution and then enters the y_pred3 detection classification head; and a fourth fusion path includes a concat3 layer and a CBL4 module, the concat3 layer acquires a feature map output by the Block2 module and acquires the feature map processed by the CBL3 module through upsampling for fusion, a fused feature map is processed by the CBL4 module, and the CBL4 module is connected to the CBL3 module through downsampling;

step S3, training the object detection network by taking the initial sample data set as a training sample: extracting features by the EfficientNet-B0 backbone network, and performing multi-scale feature fusion by the multi-scale feature fusion module to output three fused feature maps, and getting these three fused feature maps to enter the y_pred detection classification heads for recognition, wherein each fused feature map enters the y_pred detection classification heads to generate prediction boxes, the prediction boxes generated by the three y_pred detection classification heads are the same, each y_pred detection classification head is provided with three anchor boxes with different sizes, and sizes of three anchor boxes of the y_pred3 detection classification head correspond to three sizes of knife switches, sizes of three anchor boxes of the y_pred2 detection classification head correspond to three sizes of fuses, and sizes of three anchor boxes of the y_pred1 detection classification head correspond to three sizes of transformers; sizes of the prediction boxes and the nine anchor boxes are compared, a class of an anchor box with the smallest size deviation is selected as an output, which of the knife switches, the fuses and the transformers feature maps are judged, and ground truth boxes are output as recognition results; the anchor boxes are obtained by k-means clustering the initial sample data set, and inspection pictures of distribution network equipment are divided into three categories: knife switches, fuses and transformers, and each category of inspection pictures is clustered to obtain three anchor boxes with different sizes; every time output ground truth boxes are supplemented to the initial sample data set for a next k-means clustering; and step S4, detecting inspection pictures by using a trained object detection network: extracting features by the EfficientNet-B0 backbone network, and performing multi-scale feature fusion by the multi-scale feature fusion module to output three fused feature maps, and getting these three fused feature maps to enter the y_pred detection classification heads for recognition to obtain recognition results.

2. The method for recognizing distribution network equipment based on Raspberry Pi multi-scale feature fusion according to claim 1, wherein the Block1 module comprises one MBConv1Block module, a convolution kernel size is 3×3, and a stride is 2×2; the Block2 module comprises two MBConv6Block modules, and a convolution kernel size is 3×3 and a stride is 2×2; the Block3 module comprises two MBConv6Block modules, and a convolution kernel size is 5×5 and a stride is 2×2; the Block4 module comprises three MBConv6Block modules, and a convolution kernel size is 3×3 and a stride is 2×2; the Block5 module comprises three MBConv6Block modules, and a convolution kernel size is 5×5 and a stride is 2×2; the Block6 module comprises four MBConv6Block modules, and a convolution kernel size is 5×5 and a stride is 2×2; the Block7 module comprises one MBConv6Block module, a convolution kernel size is 3×3, and a stride is 1×1; the MBConv6Block modules perform depthwise separable convolution.

3. The method for recognizing distribution network equipment based on Raspberry Pi multi-scale feature fusion according to claim 2, wherein in the process of extracting features, an inverted large residual structure of the depthwise separable convolution and channel attention mechanism is introduced; before 3×3 or 5×5 network structure, 1×1 convolution is used to increase dimension, and after 3×3 or 5×5 network structure, a Squeeze- and Excitation Networks (SENet) channel attention mechanism is added, finally, 1×1 convolution is used to reduce dimension.

4. The method for recognizing distribution network equipment based on Raspberry Pi multi-scale feature fusion according to claim 2, wherein the depthwise separable convolution is performed in the MBConv6Block modules in the EfficientNet-B0 backbone network, and the depthwise separable convolution includes two parts: a depthwise convolution of a spatial dimension and a pointwise convolution of a channel dimension.

5. The method for recognizing distribution network equipment based on Raspberry Pi multi-scale feature fusion according to claim 1, wherein the extracting features by the EfficientNet-B0 backbone network means that seven feature maps are generated by continuous convolution of the Efficient Net-B0 backbone network.

6. The method for recognizing distribution network equipment based on Raspberry Pi multi-scale feature fusion according to claim 1, wherein the multi-scale feature fusion selects four feature maps output by the Block2 module, the Block3 module, the Block5 module and the Block7 module for multi-scale feature fusion stacking, so as to keep shallow features.

7. The method for recognizing distribution network equipment based on Raspberry Pi multi-scale feature fusion according to claim 1, wherein channel depths of the y_pred3 detection classification head, the y_pred2 detection classification head and the y_pred1 detection classification head are all 255, and a regular ratio of side lengths is 13:26:52; the y_pred3 detection classification head and the y_pred2 detection classification head are used to identify small object knife switches and fuses, and the y_pred1 detection classification head is used to identify transformers.

* * * * *